(12) United States Patent

Schalles

(10) Patent No.: US 12,601,644 B2

(45) Date of Patent: Apr. 14, 2026

(54) THERMOMETER WITH A DIAGNOSTIC FUNCTION

(71) Applicant: Endress+Hauser Wetzer GmbH+Co. KG, Nesselwang (DE)

(72) Inventor: Marc Schalles, Erfurt (DE)

(73) Assignee: Endress+Hauser Wetzer GmbH+Co. KG, Nesselwang (DE)

( * ) Notice: Subject to any disclaimer, the term of this patent is extended or adjusted under 35 U.S.C. 154(b) by 331 days.

(21) Appl. No.: 18/258,061

(22) PCT Filed: Nov. 26, 2021

(86) PCT No.: PCT/EP2021/083108

§ 371 (c)(1),
(2) Date: Jun. 16, 2023

(87) PCT Pub. No.: WO2022/128405

PCT Pub. Date: Jun. 23, 2022

(65) Prior Publication Data

US 2024/0053209 A1 Feb. 15, 2024

(30) Foreign Application Priority Data

Dec. 16, 2020 (DE) ..................... 10 2020 133 847.3

(51) Int. Cl.
*G01K 15/00* (2006.01)
*G01K 3/10* (2006.01)
(Continued)

(52) U.S. Cl.
CPC ............. *G01K 15/007* (2013.01); *G01K 3/10* (2013.01); *G01K 13/02* (2013.01); *G01K 7/02* (2013.01); *G01K 7/18* (2013.01)

(58) Field of Classification Search
CPC ........ G01K 15/007; G01K 3/10; G01K 13/02; G01K 7/02; G01K 7/18
See application file for complete search history.

(56) References Cited

U.S. PATENT DOCUMENTS

| | | | | |
|---|---|---|---|---|
| 4,024,751 A | * | 5/1977 | Potrzebowski | ........ G01K 17/00 374/43 |
| 4,399,823 A | * | 8/1983 | Donnelly | ................. A61B 5/01 600/549 |

(Continued)

FOREIGN PATENT DOCUMENTS

| | | |
|---|---|---|
| CN | 104458037 A1 | 3/2015 |
| DE | 102014119593 A1 | 6/2016 |

(Continued)

OTHER PUBLICATIONS

English Machine Translation of WO 2009/135504 A1 (Year: 2009).*

*Primary Examiner* — Laura Martin
*Assistant Examiner* — Philip L Cotey
(74) *Attorney, Agent, or Firm* — Christopher R. Powers; Endress+Hauser (USA) Holding, Inc.

(57) ABSTRACT

A device for determining and/or monitoring the temperature of a medium includes a temperature sensor for detecting the temperature and an electronics module, wherein the temperature sensor includes a temperature-sensitive sensor element in electrical contact with the electronics module via at least one connection line. The device further includes a diagnostic unit with a separate device for temporal variation of a power of an input signal, by which the temperature sensor or at least one component of the device can be acted upon, and which diagnostic unit is configured to determine, based on an output signal of the temperature sensor in response to the input signal, a statement about a thermal coupling of the device to the medium. A method for operating the corresponding device is also disclosed.

17 Claims, 3 Drawing Sheets

(51) Int. Cl.
G01K 7/02 (2021.01)
G01K 13/02 (2021.01)
*G01K 7/18* (2006.01)

(56) References Cited

U.S. PATENT DOCUMENTS

| | | | | |
|---|---|---|---|---|
| 4,673,300 A * | 6/1987 | Wilhelmson | G01K 7/02 | |
| | | | 374/182 | |
| 4,722,611 A * | 2/1988 | Hultgren | G01N 27/185 | |
| | | | 374/45 | |
| 6,886,393 B1 * | 5/2005 | Romanet | G01B 21/085 | |
| | | | 73/61.62 | |
| 2011/0283780 A1 * | 11/2011 | Bosbach | G01K 7/16 | |
| | | | 73/61.62 | |
| 2011/0299562 A1 * | 12/2011 | Hashemian | G01K 15/005 | |
| | | | 374/182 | |
| 2011/0308548 A1 * | 12/2011 | Amundsen | G01B 21/085 | |
| | | | 374/7 | |
| 2014/0269812 A1 * | 9/2014 | Deutscher | G01K 7/18 | |
| | | | 374/1 | |
| 2018/0106684 A1 * | 4/2018 | Umkehrer | G01K 7/16 | |
| 2018/0224338 A1 * | 8/2018 | Umkehrer | G01K 15/005 | |
| 2019/0101456 A1 * | 4/2019 | Phillips | G01K 3/00 | |
| 2019/0293241 A1 * | 9/2019 | Rud | G01K 1/16 | |
| 2019/0360876 A1 * | 11/2019 | Korn | G01K 15/00 | |
| 2021/0318177 A1 * | 10/2021 | Culbertson | G01K 7/38 | |

FOREIGN PATENT DOCUMENTS

| | | |
|---|---|---|
| DE | 102015105819 A1 | 10/2016 |
| DE | 102018116309 A1 | 1/2020 |
| DE | 102019134603 A1 | 6/2021 |
| EP | 3742139 A1 | 11/2020 |
| JP | 60233521 A | 11/1985 |
| WO | 2009135504 A1 | 11/2009 |

* cited by examiner

THERMOMETER WITH A DIAGNOSTIC FUNCTION

CROSS-REFERENCE TO RELATED APPLICATIONS

The present application is related to and claims the priority benefit of German Patent Application No. 10 2020 133 847.3, filed on Dec. 16, 2020, and International Patent Application No. PCT/EP2021/083108, filed Nov. 26, 2021, the entire contents of which are incorporated herein by reference.

TECHNICAL FIELD

The invention relates to a device for determining and/or monitoring the temperature of a medium by using a temperature sensor for detecting the temperature and an electronics module, and a method for operating a corresponding device, in particular one according to the invention, for determining and/or monitoring the temperature.

BACKGROUND

Thermometers are known from the prior art in a great variety of embodiments. Thus, there are thermometers which use the expansion of a liquid, a gas, or a solid with a known coefficient of expansion in order to measure temperature, or also others which relate the electrical conductivity of a material, or a variable derived therefrom, to the temperature, such as electrical resistance when resistance elements are used, or the thermoelectric effect in the case of thermocouples. Similarly, in the case of temperature sensors in the form of pn diodes or transistors, the temperature dependence of the respective internal resistance is utilized, and the temperature is determined, for example, on the basis of the reverse current or the forward voltage. On the other hand, radiation thermometers, in particular pyrometers, use the heat radiation of a substance to determine its temperature. The underlying measurement principles have each been described in a variety of publications.

In the case of a temperature sensor in the form of a resistance element, so-called thin-film and thick-film sensors and so-called thermistors (also referred to as NTC thermistors) have become known, among others. In the case of a thin-film sensor, in particular a resistance temperature detector (RTD), for example, a sensor element provided with connecting wires and mounted on a carrier substrate is used, wherein the back side of the carrier substrate usually has a metallic coating. As sensor elements, so-called resistance elements, for example, in the form of platinum elements, are used, which among other things are also commercially available under the designations PT10, PT100, and PT1000.

In the case of temperature sensors in the form of thermocouples, however, the temperature is determined by a thermovoltage which arises between the unilaterally connected thermo wires made of different materials. Thermocouples according to the DIN standard IEC584, e.g., thermocouples of type K, J, N, S, R, B, T, or E, are usually used as temperature sensors for temperature measurement. However, other pairs of materials, in particular those with a measurable Seebeck effect, are also possible.

The task of thermometers in process automation is basically to determine the temperature of a medium, or of a process medium, reliably and as accurately as possible. In practice, there is the problem that the temperature sensor used in each case is separated from the medium by several thermal resistances. Such thermal resistances come about, for example, as a result of the individual components of the thermometer and possibly as a result of the container in which the medium is located, e.g., a reservoir or a pipeline. The temperature sensor is often part of a so-called measuring insert with a jacket element which is filled with a filler in which the respective temperature sensor is embedded. In this case, relevant serial thermal resistances also result, for example, due to the jacket and the filler.

If the thermometer also comprises, for example, a protective tube, further serial thermal resistances arise as a result of the protective tube itself, as well as the thermal coupling between the protective tube and the measuring insert. In this connection, the choice of the length of the protective tube and of the measuring insert plays a decisive role in achieving a thermal balance between the process medium and the environment or the thermometer. If the protective tube and/or the measuring insert are/is too short, a temperature gradient may occur in the region of the temperature sensor. Such a temperature gradient depends on the one hand upon the difference in the temperature of the medium or the process temperature, as the case may be, and the ambient temperature. On the other hand, however, the thermal conductivities of the respectively used components of the thermometer, the thermal couplings between the individual components and different process parameters, such as a flow rate of the process medium or the like, also play a decisive role.

A further cause for the occurrence of temperature gradients in the region of the temperature sensor—in other words, an undesirable heat conduction—is the formation of deposition layers and/or corrosion on the thermometer, e.g., on the protective tube or measuring insert, and in particular in the region of the temperature sensor. The formation of deposits or the occurrence of corrosion leads to a change, in particular a deterioration, of the thermal coupling between the medium and the component of the thermometer respectively coming into contact with the medium, e.g., the protective tube or casing element.

The previous considerations describe the phenomenon of heat conduction at essentially constant temperatures of the medium and the environment, and thus relate to a static measured value deviation. In the case of thermal resistances, contributing, for example, to variable medium and/or ambient temperature or to heat conduction, and which depend upon variable process or environmental parameters, dynamic measured value deviations can also be important. Such dynamic measured value deviations can occur independently of or in addition to static measurement deviations. In addition, the factors leading to static and dynamic measurement value deviations can influence one another.

The previous considerations also apply analogously in the case in which the thermometer is a non-invasive thermometer which is attached to a wall of the container.

Irrespective of the embodiment of the thermometer, undesired temperature gradients occurring in the region of the temperature sensor can lead to considerable distortion of the measured values, regardless of the exact cause.

In order to avoid such distortion of measured values, it has become known, for example, to determine the true temperature value using three equidistant temperature sensors (Klaus Irrgang, Lothar Michalowsky: Temperaturmesspraxis [Temperature Measurement Practice], ISBN-13: 978380272204). However, this approach requires a comparatively complex construction and signal evaluation.

DE102014119593A1 discloses a thermometer that enables a temperature gradient to be detected along the connection lines. A resistance element in the so-called 4-conductor circuit is used as the temperature sensor. On one of the connecting wires, one piece of the connection line is replaced by another material, so that a differential thermocouple is formed from this and a further connection line. As soon as a temperature gradient occurs at the connecting wire consisting of two elements or two materials, a thermovoltage arises which gives information about the temperature gradient along the connecting wires. However, this temperature gradient only relates to the extension direction of the connecting wires. No direct statements can be made about any temperature gradients occurring directly in the region of the temperature sensor.

DE102018116309A1 discloses a thermometer which has a temperature sensor with a temperature-sensitive sensor element which is electrically contacted via at least a first and a second connection line. The first connection line is divided into a first section and a second section, wherein the first section, which faces the sensor element, consists of a first material, and wherein the second section, which faces away from the sensor element, consists of a second material which differs from the first material, while the second connection line likewise consists of the second material. The first section of the first connection line and at least a part of the second connection line then form a first differential temperature sensor in the form of a thermocouple, which is a heat flow sensor according to the thermoelectric principle. In this way, a temperature gradient or heat flow at the location of the temperature sensor can be detected. Reference is made to this application in its entirety below.

SUMMARY

Proceeding from the problem of undesirable temperature gradients in the region of the temperature sensor, the object of the present invention is to specify a thermometer with the highest measurement performance possible, in particular with high measurement accuracy.

This aim is achieved by a device and also by a method according to the present disclosure. Advantageous embodiments of the device and method are also disclosed.

The device according to the invention for determining and/or monitoring the temperature of a medium comprises a temperature sensor for detecting the temperature and an electronics module, wherein the temperature sensor comprises a temperature-sensitive sensor element which is in electrical contact with the electronics module via at least one connection line. According to the invention, the device also comprises a diagnostic unit which has a device for the temporal variation of a power of an input signal, by means of which the temperature sensor or at least one component of the device can be acted upon, and which diagnostic unit is configured to determine, on the basis of an output signal of the temperature sensor in response to the input signal, a statement about a thermal coupling of the device, and in particular of the temperature sensor, to the medium.

The device according to the invention is accordingly designed to provide a statement about a thermal coupling of the device to the medium. In this way, it is possible to correct the temperature, detected by means of the temperature sensor, with regard to possible heat conduction effects (heat supply and/or heat dissipation) or with regard to temperature gradients between the medium and the temperature sensor. Basically, not only static, but also dynamic, measured value deviations can be detected. The diagnostic unit comprises, for example, a computing unit which can form a separate unit or can be part of the electronics module of the device.

Advantageously, the statement about the thermal coupling can be determined empirically directly at the location of the device and therefore always relates to the specific, current application case. The heat conduction is in principle dependent upon many different factors, such as the thermometer geometry, the configuration of the measuring point, the environmental conditions, and the properties of the medium. All of these factors are always taken into account by the empirical local determination. Accordingly, to determine the thermal coupling or heat conduction, advantageously, no further temperature measurement values of further thermometers or knowledge of geometric or other parameters are required. Even changes in thermal coupling as a function of time can be taken into account according to the invention. Thermal coupling and the heat transport situation can thus also be monitored continuously.

In one embodiment, the device has a measuring insert in which the temperature sensor is arranged, or a measuring insert and a dipping body for receiving the measuring insert.

Alternatively, a further embodiment includes the device being configured such that at least the temperature sensor can be indirectly or directly attached to an outer wall of a container. The temperature sensor can thus, on the one hand, be located directly on the wall of the container. However, it can also be attached indirectly, e.g., if it is part of a measuring insert, or if a mounting device or the like is used which is arranged partially between the wall and the temperature sensor. The present invention thus relates to invasive and non-invasive thermometers.

The thermometer can likewise be designed according to one of the embodiments described in DE102014119593A1. An advantageous embodiment likewise includes the temperature sensor making electrical contact via at least one first and one second connection line, wherein the first connection line is divided into a first and a second section, wherein the first section pointing towards the sensor element consists of a first material, and wherein the second section facing away from the sensor element consists of a second material that differs from the first, wherein the second connection line consists of the second material, and wherein the first section of the first connection line and at least a part of the second connection line form a first differential temperature sensor in the form of a thermocouple. Accordingly, a design corresponding to the teaching of the previously mentioned DE102018116309A1 is also conceivable.

As a result of the variation in the power of the input signal, heating and/or cooling occurs in the region of the temperature sensor as a function of the input signal or of the temporal variation in the power. In this case, the temperature sensor itself can be supplied with the input signal of variable power. This is advantageous in particular in the case of a temperature sensor in the form of a resistance element. A further embodiment of the device includes, however, the device comprising a heating unit for heating a region surrounding the temperature sensor, wherein the diagnostic unit is configured to apply the input signal of variable power to the heating unit and, from the output signal of the temperature sensor, to determine the statement about a thermal coupling of the device to the medium. In the case where the device includes a heating unit, it is accordingly possible to operate the heating unit with variable power and to evaluate the response of the temperature sensor.

A further embodiment provides that the diagnostic unit comprise an energy store, and in particular a capacitor or a rechargeable battery. In this way, sufficient energy for generating the input signal of variable power can always be guaranteed, even if the device has only a limited power consumption, such as, for example, in the case of an embodiment of the device as a two-wire measuring device.

The object upon which the invention is based is also achieved by a method for operating a device for determining and/or monitoring the temperature of a medium comprising a temperature sensor for detecting the temperature of a medium, and an electronics module, in particular a device according to the invention according to at least one of the described embodiments. In the method according to the invention, a power of an input signal, by means of which the temperature sensor or at least one component of the device can be acted upon, is varied in time, and a statement about a thermal coupling of the device to the medium is determined on the basis of an output signal of the temperature sensor in response to the input signal.

The input signal is preferably an alternating signal—for example, a sine, square, or delta signal. One embodiment further includes a mean-value-free signal being used for the input signal such that the average power is constant over time. Also possible is the use of a noise signal as an input signal, in particular corresponding to a white noise.

It is advantageously possible to determine a state indicator for the thermometer on the basis of the statement determined regarding the thermal coupling. In this case, therefore, this is a method which likewise serves for monitoring the state of the device used for determining and/or monitoring the temperature. The state indicator is, for example, a statement about a thermal or mechanical contact in the region of the measurement system comprising the device and the container with the medium. In the case of an invasive temperature determination and/or monitoring, it is additionally possible to make a statement about the occurrence of corrosion or of a formation of deposits.

In one embodiment of the method, the input signal is applied to a heating unit for heating a region surrounding the temperature sensor, and, from the output signal of the temperature sensor, the statement about a thermal coupling of the device to the medium is determined.

A further embodiment of the method provides that a frequency or amplitude modulation be performed for the temporal variation of the power of the input signal. Alternatively, an embodiment includes a pulsed input signal being used, and in particular individual pulses being varied at least with respect to a characteristic variable—for example, frequency or amplitude. In the case of a pulsed input signal, an interpolation and a zero-point determination can be made on the basis of at least two pulses, which enables the additional performance of a self-heating test of the device.

One embodiment of the method includes that, in a measurement operating mode, the temperature of the medium is determined, that, in a diagnostic operating mode, the statement is determined via a thermal coupling of the device to the medium, and that the measurement operating mode and the diagnostic operating mode are performed simultaneously or alternately, or wherein the diagnostic operating mode is initialized as required by a user of the device. The results of the diagnostic operating mode can then immediately be taken into account in the measurement operating mode during determination of the temperature of the medium. An output of the result of the diagnosis is also conceivable.

In one embodiment of the method, a heating behavior, a cooling behavior, a response time, or a variable of the temperature sensor derived from at least one of these variables is used to determine the at least one statement about a thermal coupling of the device to the medium. It should be pointed out that this enumeration of the possibilities for evaluating the output signal of the temperature sensor is by no means conclusive with regard to the thermal coupling to the medium. It is rather the case that numerous further types of evaluation are conceivable, such as, for example, a Fourier analysis, which also fall under the present invention. The options explicitly mentioned here are only particularly preferred variants.

In this connection, it is advantageous if a time profile of the heating behavior, the cooling behavior, the response time, or the derived variable of the temperature sensor is considered, and a change in the thermal coupling is determined on the basis of a change in the heating behavior, the cooling behavior, the response time, or the derived variable. In this regard, it is conceivable, for example, to determine heating and/or decay constants, to determine certain final values of a heating or cooling process as a result of a change in the power of the input signal or of a variable derived therefrom, or also to carry out comparisons with, in particular stored, limit values.

In the case where the medium is known, it is also advantageous to determine a flow rate of the medium on the basis of the output signal of the temperature sensor.

A further embodiment of the method according to the invention includes that the at least one statement about the thermal coupling is a statement about a heat transfer coefficient, a heat transport resistance, a heat conducting resistance, and/or a heat transfer value in the region of the device, in particular in the region of the temperature sensor, or of a transition between the device and a container containing the medium, or that it concerns a change in a mechanical or thermal contact of at least two components of the device or the device and the container. In principle, all thermal resistances relevant to the precise temperature determination can be taken into account.

A correction of the temperature detected by means of the temperature sensor can be carried out on the basis of the statement about the thermal coupling of the device to the medium. For this purpose, for example, a correction value, e.g., in the diagnostic unit or in the electronics module, can be determined and added to the measured value for the temperature from the temperature sensor. It is therefore also possible for the measured values determined by means of the temperature sensor to be corrected, adjusted, and/or compensated for in each case with regard to undesired temperature gradients which can occur in the region of the temperature sensor.

In this connection, one embodiment of the method includes that a measured value for the temperature of the medium is determined on the basis of the received signal, that a heat flow, in particular a heat conduction, or a variable connected to the heat flow, is determined in the region of the temperature sensor, that a measured value deviation for the measured value for the temperature is determined on the basis of a model for a heat flow in the region of the temperature sensor, and that the measured value for the temperature is corrected by means of the measured value deviation. In this connection, reference is made to the thus far unpublished German patent application with file number 102019134603.7, which is also referred to in full in the context of the present application. This embodiment of the method can, furthermore, preferably be used in connection with a device with a differential temperature sensor, as described in connection with the device according to the invention. The differential temperature sensor can then advantageously serve to determine the heat flow.

In order to determine the measured value deviation, a heat flow in the region of the temperature sensor or a variable related to this heat flow, e.g., a variable derived from the heat flow, or a variable representing the heat flow, e.g., a voltage, is determined, and a measured value deviation for the measured values for the temperature is determined therefrom on the basis of a suitable model. The heat flow can be determined by means of a separate device or by means of the thermometer used for determining and/or monitoring the temperature.

The model is preferably a parametric model which, in particular, has at least one static and one dynamic term for determining the measured value deviation.

In this connection, it is advantageous if at least one parameter value of a parameter or one coefficient value of a coefficient of the model is determined on the basis of the statement about the thermal coupling of the device to the medium.

It is also advantageous if a plurality of parameter values are predefined or stored for at least one parameter of the model as a function of the thermal coupling of the device, and wherein a parameter value for the parameter is selected as a function of the statement determined about the coupling. Alternatively, it is advantageous if the parameter value is determined on the basis of the statement about the coupling.

It should be noted that the embodiments described in connection with the method according to the invention also apply, mutatis mutandis, to the device according to the invention, and vice versa.

BRIEF DESCRIPTION OF THE DRAWINGS

The invention is explained in more detail based upon the following drawings. The following are shown:

FIG. 3a shows an input signal as a function of time of a method according to the present disclosure;

FIG. 3b shows an output signal as a function of time of the temperature sensor in response to the input signal shown in FIG. 3a; and FIG. 3c shows an exemplary self-heating test method of a thermometer according to the present disclosure.

In the figures, the same features are identified with the same reference signs.

DETAILED DESCRIPTION

Figure 1A:
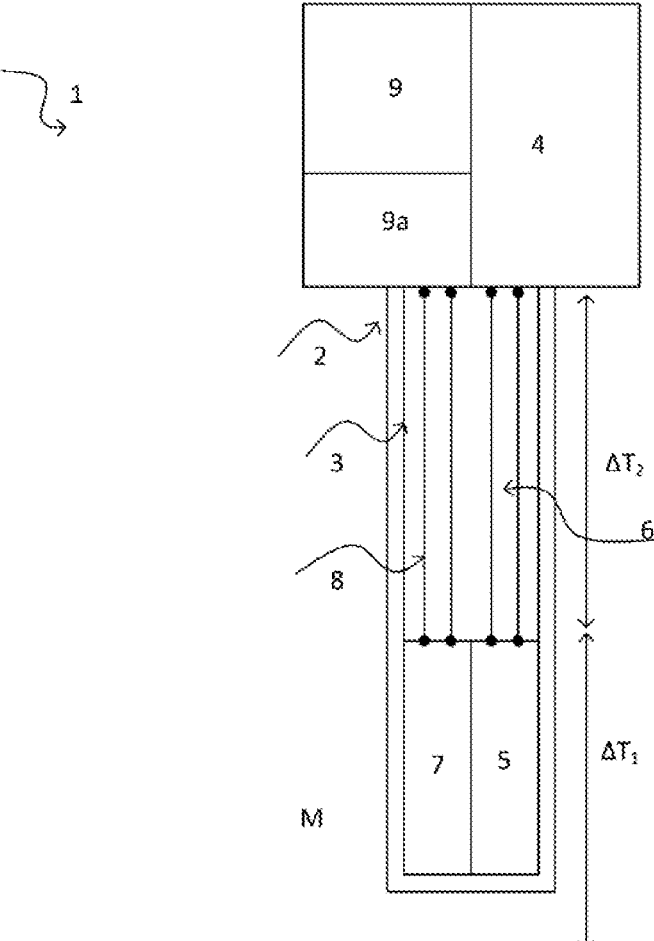
FIG. 1a shows a schematic representation of an invasive thermometer with a temperature sensor in the form of a resistance element, a heating unit, and a diagnostic unit according to the present disclosure.

FIG. 1a shows a schematic representation of an invasive thermometer 1 with a dipping body 2, e.g., a protective tube, a measuring insert 3, and an electronics module 4 according to the prior art. The measuring insert 3 is introduced into the dipping body 2 and comprises a temperature sensor 5, which in the present case has a temperature-sensitive element in the form of a resistance element, and a heating element 7. The temperature sensor 5 and the heating element 7 can be embedded in a filler which is arranged in the measuring insert 3 and is not shown here. The temperature sensor 5 is electrically contacted via the connection lines 6 and the heating element 7 via the connection lines 8, and in each case connected to the electronics module 4. For the embodiment shown by way of example here, the electronics module 4 also comprises the diagnostic unit 9 according to the invention with a device 9a for generating an input signal of variable power. In other embodiments, the electronics module 4 can also be arranged separately from the measuring insert 3 and the dipping body 2, and/or the diagnostic unit 9 can be arranged separately from the electronics module 4 and/or the measuring insert 3 and the dipping body 2. In addition, the sensor element 5 need not necessarily be a resistance element, nor does the number of connection lines 6, 8 used need necessarily be two. It is rather the case that the number of connection lines 6, 8 can be selected appropriately depending upon the measurement principle used and the temperature sensor 5 or heating unit 7 used. It should also be pointed out that the use of an additional heating unit 7 is in principle optional. In addition, numerous variants for the arrangement of the heating unit 7 relative to the temperature sensor 5 are conceivable.

Figure 1B:
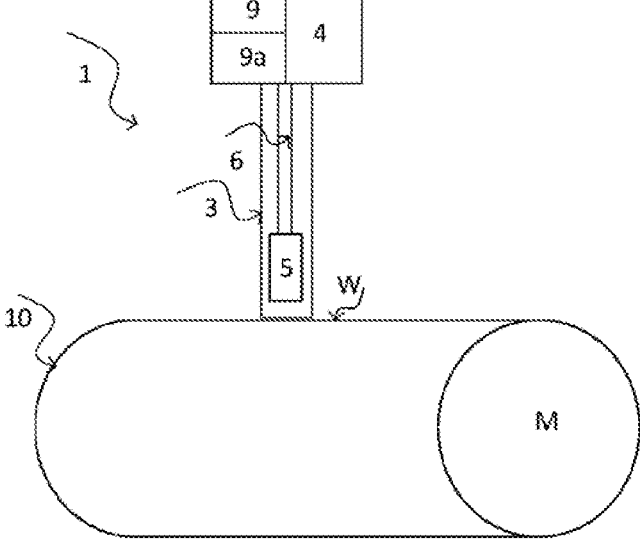
FIG. 1b shows a schematic representation of a non-invasive thermometer with a temperature sensor in the form of a resistance element and a diagnostic unit according to the present disclosure.

Alternatively, the device 1 according to the invention can, however, also be a non-invasive thermometer, as illustrated in FIG. 1b. In this case, the thermometer 1 is arranged from the outside on a wall W of a container 10 carrying the medium M and does not project into the medium M, as in the case of the embodiment according to FIG. 1a. For this embodiment too, the temperature sensor 5 is designed by way of example in the form of a resistance element. On the other hand, a heating unit 7 is not present in this embodiment, but would additionally be possible. Here too, the temperature sensor 5 together with the connection lines 6 is arranged in a measuring insert 3. The temperature sensor 5 is correspondingly arranged by means of the measuring insert 3, i.e., indirectly, on the wall W of the container 10. In other embodiments, a direct arrangement or an indirect arrangement can also be implemented by means of a mounting device. Even the compact design shown here with integrated electronics module 4 is not mandatory. The same applies to the orientation shown of the measuring insert 3, which does not necessarily have to be oriented vertically, but can also have other orientations in other embodiments. For example, a tangential arrangement in which a longitudinal axis L of the measuring insert 3 is arranged parallel to the wall W of the container 10 is also conceivable. Likewise, the use of a measuring insert 3 for a non-invasive thermometer 1 is not necessarily required. It is rather the case that, as in the case of FIG. 1a, numerous further embodiments are possible, all of which fall under the present invention.

As already explained, the measuring accuracy of a thermometer 1 depends to a large extent upon the respective materials and upon contacting means, in particular thermal contacting means, in particular in the region of the temperature sensor 5. The temperature sensor 5 is in thermal contact with the medium M indirectly, i.e., for example, via the dipping body 2, measuring insert 3, and/or the wall W of the container 10. The temperature sensor 5 is thus separated from the medium M by several thermal resistances. Depending upon the process conditions and/or the respective structural design of the thermometer 1, it is therefore possible that there is no thermal equilibrium between the medium M and the thermometer, at least temporarily and/or partially. As a result of the absence of a thermal equilibrium, temperature gradients $\Delta T_1$ or $\Delta T_2$ may arise, for example, in the region of the temperature sensor 5 or also along the connection lines 6, said temperature gradients, as a result of resulting heat flows, distorting the temperature values measured in each case with the temperature sensor 5. This is shown by way of example in FIG. 1a. Furthermore, such thermal resistances, which are not located in the immediate vicinity of the temperature sensor 5 or medium M, can also change. A change in these thermal resistances leads to a changed coupling to the medium M. In the case of a non-invasive thermometer 1, it can, in this connection, for example, be a thermal insulation for the temperature sensor 5 arranged outside the container 10.

With the diagnostic unit according to the invention, depending upon the design of the thermometer 1, the temperature sensor 5 or the heating unit 7 can now be supplied with an input signal of variable power, and the respective output signal of the temperature sensor 5 can be evaluated with respect to the thermal coupling to the medium M. In this way, the measurement accuracy of the device 1 can be significantly increased.

Temperature gradients $\Delta T_1$ in the region of the temperature sensor 5 are of particular relevance. An embodiment of the device 1 comprising a differential temperature sensor can accordingly bring about a further improvement in the measurement accuracy.

Figures 2A, 2B:
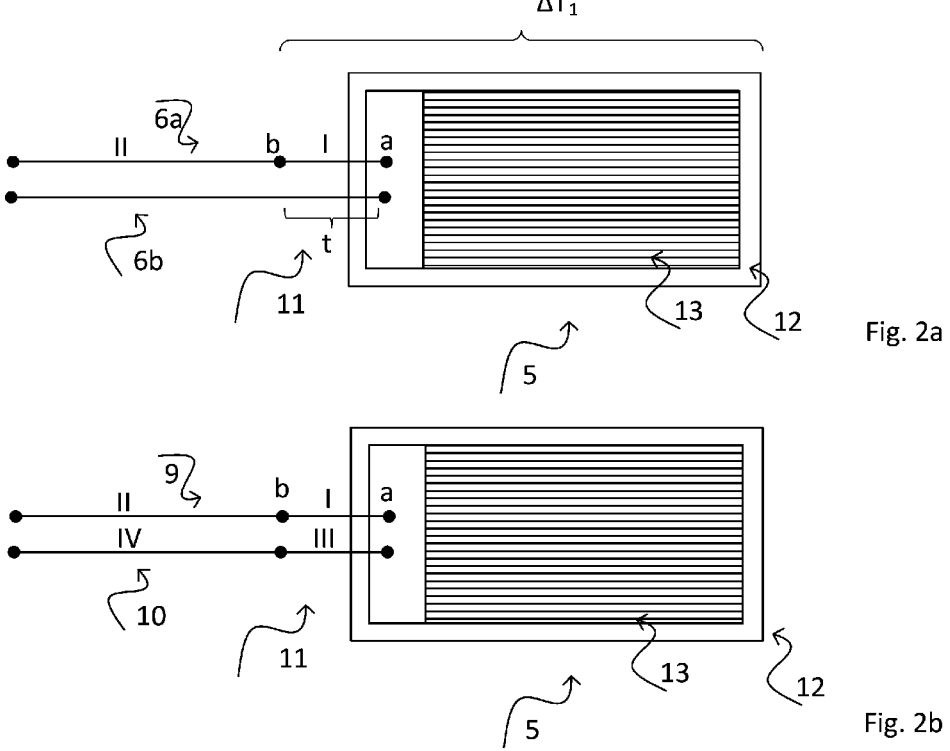
FIG. 2a shows an exemplary embodiment of a thermometer with a differential temperature sensor for determining the heat flow.
FIG. 2b shows another exemplary embodiment of a thermometer with a differential temperature sensor for determining the heat flow.

FIGS. 2a and 2b show by way of example possible embodiments of a thermometer 1 with a differential temperature sensor 11 for determining the heat flow. A temperature sensor 5 in the form of a resistance element 13 applied to a substrate 12 is used for determining and/or monitoring the temperature T of the medium M. The temperature sensor 5 is electrically contacted by means of the two connection lines 6a and 6b and is thus operated in the so-called two-conductor circuit. In the present case, both connection lines 6a and 6b are attached directly to the resistance element 13. However, it should be noted at this point that all contacting means known to the person skilled in the art are possible in principle for connecting the temperature sensor 5 to the connection lines 6.

The first connection line 6a is divided into a first section I and a second section II. The first section I consists of a first material, and the second section II and also the second connection line 6b consist of a second material which differs from the first material. In this way, the first section I of the first connection line 6a and at least a part t of the second connection line 6b form a first differential temperature sensor 11 in the form of a thermocouple. The two materials for the first section I of the first connection line 6a and the second section II of the first connection line 6a and for the second connection line 6b are selected in such a way that, due to a temperature difference between the points a and b, and the different thermovoltages forming accordingly in the sections 9a and t due to the thermoelectric effect, a thermal voltage can be detected by means of the difference temperature sensor 11.

The first section I of the first connection line 6a is preferably short in comparison to the total length of the first connection line 6a; for example, the length of the first section I of the first connection line 6a is in the range of a few millimeters or centimeters. In this way, it can be ensured that the values determined by means of the first differential temperature sensor 11 reflect as far as possible a temperature gradient $\Delta T_1$ in the region of the temperature sensor 5.

In the example shown in FIG. 2a, the first connection line 6a and the second connection line 6b are attached separately to the resistance element 13. The first section I of the first connection line 6a and the part t of the second connection line 6b are thus indirectly connected via the resistance element 13. In another embodiment, however, the first section I of the first connection line 6a and the part t of the second connection line 6b could also be connected directly to one another and then attached to the temperature sensor 5.

In the embodiment shown in FIG. 2b, the second connection line 6b is also divided into a first section III and a second section IV. In this case, the first differential temperature sensor 11 is formed by the first sections I and III of the first 6a and the second 6b connection lines. According to FIG. 2b, but not necessarily, the two first sections I and III of the two connection lines 6a and 6b are of the same length. In this case, the second sections II and IV of the first connection line 6a and of the second 6b connection lines are extension wires, preferably of similar design. However, in the case of the embodiment according to FIG. 2a, it is also advantageous if the second section II of the first connection line 6a and the second connection line 6b are of similar design.

By means of the differential temperature sensor 11, a heat flow W can be determined, and a suitable model MOD can be provided for the heat conduction, by means of which a measured value deviation $\delta T$ can be determined. By means of the measured value deviation $\delta T$, the measured values determined by the temperature sensor 5 can be corrected and/or adjusted, i.e., measurement errors can be compensated for, and/or state monitoring of the thermometer 1 can be carried out.

In this connection, however, the invention is by no means limited to combinations designed in this way of the temperature sensors 5 and at least one additional thermocouple. In other embodiments, in which, in addition to a temperature sensor 5, an additional thermocouple is formed by means of the connection lines 6, it is also possible on the other hand for sections of the connection lines 6 pointing towards the temperature sensor 5 and sections pointing away from the temperature sensor 5 to be designed differently. As already mentioned, an embodiment according to the teaching of DE102014119593A1 is also possible.

Figures 3A, 3B, 3C:
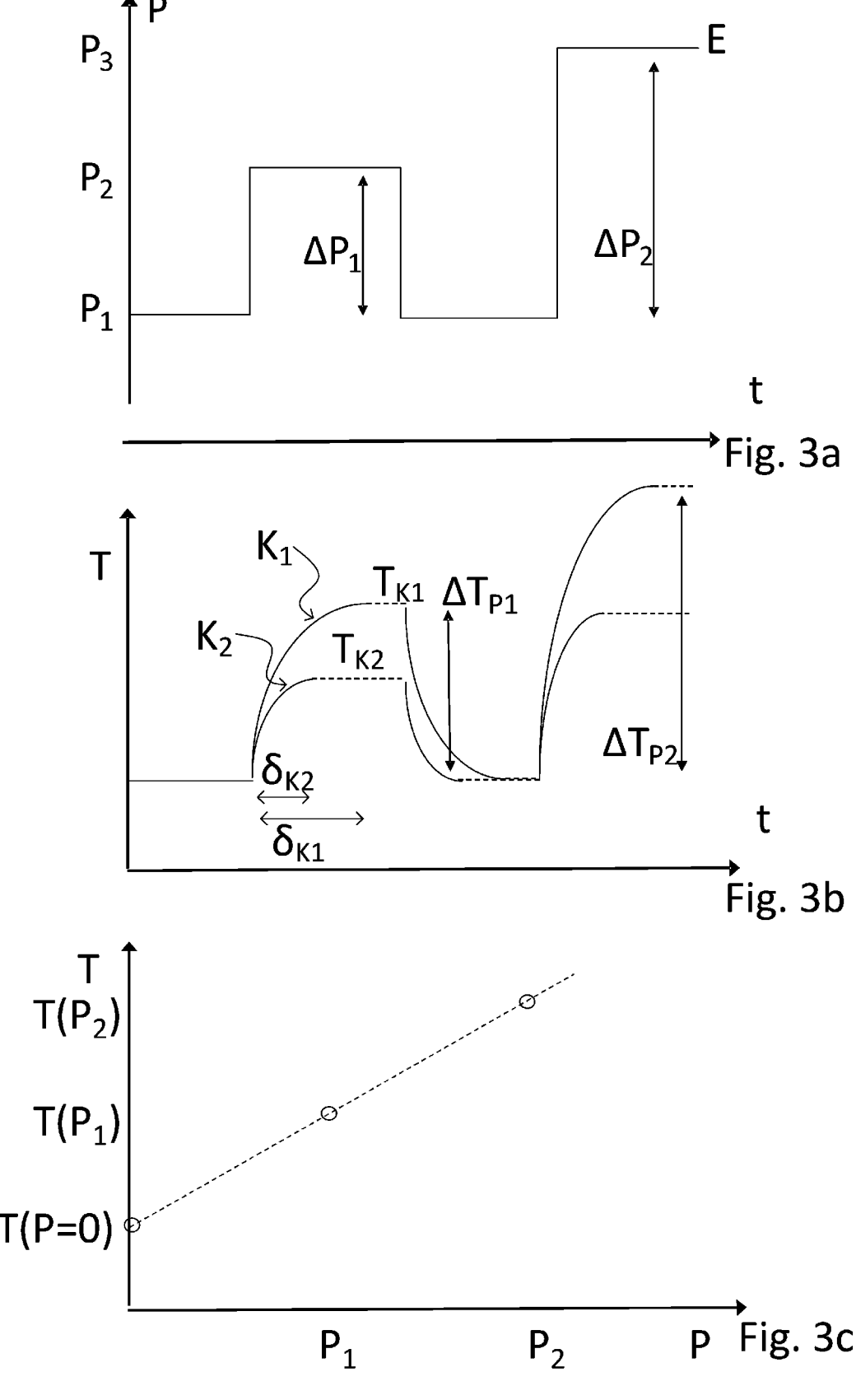

FIGS. 3a and 3b illustrate a preferred embodiment of the method according to the invention. FIG. 3a shows an input signal E of variable line P as a function of time t, present for the example shown in the form of a pulsed signal. Shown are two pulses $\Delta P_1 = P_2 - P_1$ and $\Delta P_2 = P_3 - P_1$ of different amplitudes. In addition to a variation of the amplitude, other characteristic variables, such as for example the frequency, or also several characteristic variables can also be varied, which cause a change in the line P of the input signal E. The output signal A of the temperature sensor 5 in response to the input signal E from FIG. 3a is illustrated in FIG. 3b. The temperature response of the temperature sensor 5 as a result of the pulsed input signal E from FIG. 3a is shown. The amplitude T of the output signal A changes on the one hand with the power P. Thus, the temperature response $\Delta T_{P1}$ to the first power pulse $\Delta P_1$ has a smaller amplitude than the temperature response, here only indicated, $\Delta T_{P2}$ to the first power pulse $\Delta P_2$.

In addition, however, the amplitude T and also a time constant $\delta$ of the step response of the temperature sensor 5 as a result of the line pulse $\Delta P_1$ depends upon the coupling to the medium M, as will be explained in more detail below using the example of the response to the first power pulse $\Delta P_1$. The curve denoted by $K_1$ relates to a poor coupling to the medium M compared to the curve denoted by $K_2$, and $K_2$ relates to a comparatively good coupling to the medium M. In the case of the comparatively poor coupling K1, the response signal A has, as a result of the power pulse $\Delta P_1$, a greater amplitude $T_{K1}$ and a greater time constant $\delta_{K1}$. The reaction to the line pulse $\Delta P_1$ is therefore significantly more sluggish, while the amplitude of the response is greater. In the case of the good coupling $K_2$ on the other hand, the response signal A has, as a result of the power pulse $\Delta P_1$, a lower amplitude $T_{K2}$ and a smaller time constant $\delta_{K2}$. The reaction to the line pulse $\Delta P_1$ is thus significantly faster, while the amplitude of the response is lower. The amplitude of the output signal A in response to the input signal E of variable power P thus decreases with the quality of the coupling, while the time constant $\delta$ increases with increasing quality of the coupling. These considerations can be applied directly to the response, likewise shown in FIG. 3b, to the second power pulse $\Delta P_2$ of the input signal E. It goes without saying that, in addition to the evaluation of the amplitude T and time constant $\delta$ described here, one or more other characteristic variables of the output signal A or variables derived from at least one characteristic variable of the output signal A can also be used to determine a statement about the coupling to the medium M, such as, for example, ratios of the amplitudes, time percentage characteristic values, ratios of the temperature changes after certain defined time intervals, and many others.

In addition, it is possible to determine the amplitude TK of the response signal A for different power pulses $\Delta P$. This also allows a conclusion to be drawn about a relationship between the power P of the input signal and the measured temperature T, and thus an extrapolation to a temperature T in the case in which P=0. It is thus possible to carry out a self-heating test, as illustrated in FIG. 3c. In this connection, however, it is desirable if the temperature T of the medium M, for the period required for extrapolation, does not change or changes only insignificantly.

The invention claimed is:

1. A device for determining and/or monitoring a temperature of a medium, the device comprising:
   a temperature sensor configured to detect the temperature of the medium, wherein the temperature sensor includes a temperature-sensitive sensor element;
   an electronics module, wherein the temperature-sensitive sensor element is in electrical contact with the electronics module via at least one connection line, wherein:
      the at least one connection line includes a first connection line and a second connection line,
      the temperature sensor is electrically contacted via the first connection line and the second connection line,
      the first connection line is divided into a first section and a second section,
      the first section, which faces the sensor element, consists essentially of a first material,
      the second section, which faces away from the sensor element, consists essentially of a second material, which differs from the first material,
      the second connection line consists essentially of the second material,
      the first section of the first connection line and at least a part of the second connection line form a first differential temperature sensor in the form of a thermocouple in a region of the temperature-sensitive sensor element; and
   a diagnostic unit configured for temporal variation of a power of an input signal, by which the temperature sensor or at least one component of the device can be acted upon, wherein the diagnostic unit is further configured to determine, based on an output signal of the temperature sensor in response to the input signal, a statement about a thermal coupling of the temperature sensor to the medium.

2. The device of claim 1, wherein the device comprises a measuring insert in which the temperature sensor is disposed, or a measuring insert and a dipping body configured to receive the measuring insert, or
   wherein the device is configured to enable at least the temperature sensor to be fastened indirectly or directly to an outer wall of a container in which the medium is disposed.

3. The device of claim 1, further comprising a heating element configured to heat a region surrounding the temperature sensor,
   wherein the diagnostic unit is configured to apply the input signal of variable power to the heating element and, from the output signal of the temperature sensor, to determine the statement about the thermal coupling of the temperature sensor to the medium.

4. The device of claim 1, wherein the diagnostic unit comprises an energy store.

5. The device of claim 4, wherein the energy store is a capacitor or a rechargeable battery.

6. A method for operating the device according to claim 1 for determining and/or monitoring the temperature of the medium, the method comprising:
   varying the power of the input signal, by which the temperature sensor or at least one component of the device can be acted upon; and
   determining the statement about the thermal coupling of the temperature sensor to the medium based on the output signal of the temperature sensor in response to the input signal.

7. The method of claim 6, wherein the device further comprises a heating element configured to heat a region surrounding the temperature sensor,
   wherein the diagnostic unit is configured to apply the input signal to the heating element, and wherein the statement about the thermal coupling of the temperature sensor to the medium is determined from the output signal of the temperature sensor.

8. The method of claim 7, wherein:
   a measured value for the temperature of the medium is determined based on the output signal of the temperature sensor;
   a heat flow, or a variable related to the heat flow, is determined in the region of the temperature sensor from the first differential temperature sensor;
   a measured value deviation for the measured value for the temperature is determined based on a model of the heat flow in the region of the temperature sensor; and
   the measured value for the temperature is corrected by the measured value deviation.

9. The method of claim 8, wherein at least one parameter value of a parameter of the model is determined based on the statement about the thermal coupling of the temperature sensor to the medium.

10. The method of claim 8, wherein, for at least one parameter of the model, a plurality of parameter values is predetermined or stored as a function of the thermal coupling of the temperature sensor, and wherein the at least one parameter value for the parameter is selected from the plurality of parameter values as a function of the statement determined about the thermal coupling, or
   wherein the at least one parameter value is determined based on the statement about the thermal coupling.

11. The method of claim 6, wherein a frequency or amplitude modulation is performed for the temporal variation of the power of the input signal, or wherein a pulsed input signal is applied, wherein individual pulses are varied at least with respect to a characteristic signal variable.

12. The method of claim 11, wherein the characteristic signal variable is frequency or amplitude.

13. The method of claim 6, further comprises determining the temperature of the medium in a measurement operating mode, wherein, in a diagnostic operating mode, the statement about the thermal coupling of the temperature sensor to the medium is determined, and wherein the measurement operating mode and the diagnostic operating mode are performed simultaneously or alternately, or wherein the diagnostic operating mode is initialized as required by a user of the device.

14. The method of claim 6, wherein the statement about the thermal coupling of the temperature sensor to the medium determined based on a heating behavior, a cooling behavior, a response time, or a variable of the temperature sensor derived from at least one of the foregoing variables.

15. The method of claim 14, wherein the heating behavior, the cooling behavior, the response time, or the derived variable of the temperature sensor respectively include a time profile of the heating behavior, the cooling behavior, the response time, or the derived variable of the temperature sensor, respectively, and wherein a change in the thermal coupling is determined based on a change in the heating behavior, the cooling behavior, the response time, or the derived variable.

16. The method of claim 6, wherein the statement about the thermal coupling is a statement about at least one of a heat transfer coefficient, a heat transport resistance, a thermal conductivity resistance, and a heat transfer value in a region of the device or of a transition between the device and a container containing the medium, or wherein the statement about the thermal coupling concerns a change in a mechanical or thermal contact of at least two components of the device or of the device and the container.

17. The method of claim 16, wherein the region of the device is a region of the temperature sensor.

* * * * *